United States Patent
Cao et al.

(10) Patent No.: US 11,212,252 B2
(45) Date of Patent: Dec. 28, 2021

(54) IP ADDRESS ALLOCATION METHOD, AND DEVICE

(71) Applicant: Huawei Technologies Co., Ltd., Shenzhen (CN)

(72) Inventors: Longyu Cao, Shanghai (CN); Yanping Zhang, Shanghai (CN); Runze Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/106,864

(22) Filed: Nov. 30, 2020

(65) Prior Publication Data

US 2021/0084007 A1  Mar. 18, 2021

Related U.S. Application Data

(63) Continuation of application No. 16/039,225, filed on Jul. 18, 2018, now Pat. No. 10,873,563, which is a (Continued)

(51) Int. Cl.
*H04L 29/12* (2006.01)
*H04W 80/04* (2009.01)
(Continued)

(52) U.S. Cl.
CPC ........ *H04L 61/2046* (2013.01); *H04L 61/203* (2013.01); *H04L 61/2015* (2013.01);
(Continued)

(58) Field of Classification Search
CPC .......... H04L 61/2046; H04L 61/2061; H04W 76/10; H04W 76/11; H04W 80/04; H04W 8/18

See application file for complete search history.

(56) References Cited

U.S. PATENT DOCUMENTS 10,506,648 B2 * 12/2019 Li .................. H04W 76/12
10,972,552 B2 * 4/2021 Li .................. H04L 47/14
(Continued)

FOREIGN PATENT DOCUMENTS

CN  1964564 A  5/2007
CN  101106579 A  1/2008
(Continued)

OTHER PUBLICATIONS

ETSI MCC "Draft Report of 3GPP TSG RAN WG2 meeting #91 Beijing," China, Aug. 24-28, 2015 R2-154002 3GPP TSG-RAN Working Group 2 meeting #91bis Malm, Sweden, Oct. 5-9, 2015, 162 pages.
(Continued)

*Primary Examiner* — Shean Tokuta
(74) *Attorney, Agent, or Firm* — Conley Rose, P.C.

(57) ABSTRACT

An Internet Protocol (IP) address allocation method and a device to resolve a technical problem that an IP address conflict occurs when a control plane device and a user plane device allocate an IP address for one user equipment (UE) at the same time. When receiving a session establishment request message, a control plane network device may determine whether a first user plane network device is capable of allocating an IP address for a terminal device. If the first user plane network device is capable of allocating the IP address for the terminal device, the control plane network device may send an address allocation indication to the first user plane network device.

20 Claims, 9 Drawing Sheets

Related U.S. Application Data continuation of application No. PCT/CN2016/071393, filed on Jan. 19, 2016.

(51) Int. Cl.
*H04W 76/11* (2018.01)
*H04W 76/10* (2018.01)
*H04W 8/18* (2009.01)
*H04W 48/12* (2009.01)

(52) U.S. Cl.
CPC ........... *H04L 61/2061* (2013.01); *H04W 8/18* (2013.01); *H04W 48/12* (2013.01); *H04W 76/10* (2018.02); *H04W 76/11* (2018.02); *H04W 80/04* (2013.01)

(56) References Cited

U.S. PATENT DOCUMENTS

| | | |
|---|---|---|
| 2011/0270978 A1 | 11/2011 | Norman et al. |
| 2014/0344477 A1 | 11/2014 | Shigeeda |
| 2015/0052234 A1 | 2/2015 | Hahn |
| 2015/0110095 A1* | 4/2015 | Tan ................... H04L 41/0806 370/338 |
| 2015/0112996 A1 | 4/2015 | Mishra et al. |
| 2015/0312806 A1 | 10/2015 | Perras et al. |
| 2016/0360441 A1* | 12/2016 | Shi ....................... H04W 28/04 |
| 2017/0005981 A1 | 1/2017 | Wang et al. |
| 2017/0208634 A1* | 7/2017 | Bharatia .............. H04W 76/11 |
| 2018/0295659 A1 | 10/2018 | Shan |
| 2018/0302439 A1* | 10/2018 | Hoffmann ............... H04L 47/12 |
| 2018/0302941 A1* | 10/2018 | Li ......................... H04W 88/16 |
| 2018/0324140 A1 | 11/2018 | Cao et al. |
| 2019/0230061 A1* | 7/2019 | Li ......................... H04W 76/11 |
| 2019/0261351 A1* | 8/2019 | Zhou ................ H04W 72/1242 |

FOREIGN PATENT DOCUMENTS

| | | | |
|---|---|---|---|
| CN | 102299973 A | 12/2011 | |
| CN | 103384279 A | 11/2013 | |
| CN | 103581354 A | 2/2014 | |
| CN | 103636283 A | 3/2014 | |
| CN | 104106239 A | 10/2014 | |
| CN | 104335553 A | 2/2015 | |
| CN | 104684044 A | 6/2015 | |
| CN | 104969653 A | 10/2015 | |
| EP | 2597896 A1 | 5/2013 | |
| EP | 3076706 A1 | 10/2016 | |
| WO | 2014000286 A1 | 1/2014 | |
| WO | 2015139166 A1 | 9/2015 | |
| WO | WO-2015139166 A1 * | 9/2015 | ......... H04L 61/2007 |
| WO | 2017078776 A1 | 5/2017 | |
| WO | WO-2017078776 A1 * | 5/2017 | ............. H04W 4/24 |
| WO | 2017124231 A1 | 7/2017 | |
| WO | 2017124308 A1 | 7/2017 | |
| WO | WO-2017124231 A1 * | 7/2017 | ............. H04L 29/08 |
| WO | WO-2017124308 A1 * | 7/2017 | ......... H04L 61/2061 |

OTHER PUBLICATIONS

Said, S., et al., "New control plane in 3GPP LTE/EPC architecture for on-demand connectivity service," 2013 IEEE 2nd International Conference on Cloud Networking (Cloud Net), Jan. 16, 2014, 5 pages.

Chen, F., et al., "Fast Access Network Architecture for 3GPP Long Term Evolution," May 2006, 4 pages.

3GPP Organizational Partners, "3rd Generation Partnership Project; Technical Specification Group Service and System Aspects; General Packet Radio Service (GPRS) Enhancement for Evolved Universal Terrestrial Radio Access Network (E-UTRAN) Access (Release 13)," 3GPP TS 23.401, V13.4.0, 2015.

Shan, C., "Se5rving Gateway/Packet Gateway User Plane Internet Protocol Address and Tunnel Endpoint Identifier Allocation," Nov. 6, 2015, 2015, PCT/CN2015/094002.

* cited by examiner

IP ADDRESS ALLOCATION METHOD, AND DEVICE

CROSS-REFERENCE TO RELATED APPLICATIONS

This application is a continuation of U.S. patent application Ser. No. 16/039,225, filed on Jul. 18, 2018, which is a continuation of International Patent Application No. PCT/CN2016/071393, filed on Jan. 19, 2016. All of the aforementioned patent applications are hereby incorporated by reference in their entireties.

TECHNICAL FIELD

The present disclosure relates to the field of mobile communications technologies, and in particular, to an Internet Protocol (IP) address allocation method and a device.

BACKGROUND

In other approaches, when a user equipment (UE) is in a process of attaching to a network or in a procedure of establishing a packet data network (PDN) connection requested by the UE, a network device establishes a default bearer for the UE. At the same time, the network device allocates a corresponding IP address to the UE. Currently, a PDN gateway (P-GW) usually allocates the IP address for the UE.

With evolution of a network architecture towards a 4.5th generation (4.5G) mobile communications system/5th generation (5G) mobile communications system, separation of a control plane and a user plane of a network function is a main trend. If the P-GW is separated into a control plane device and a user plane device, an IP address allocation function of the P-GW may be inherited by the control plane device or may be inherited by the user plane device, in other words, both the control plane device and the user plane device may be capable of allocating the IP address. In this case, if the control plane device and the user plane device allocate an IP address for one UE at the same time, a problem of an IP address conflict is caused. Currently, there is still no solution for this problem.

SUMMARY

This application provides an IP address allocation method and a device, in order to resolve a technical problem that an IP address conflict occurs when a control plane device and a user plane device allocate an IP address for one UE at the same time.

According to a first aspect, a first IP address allocation method is provided, including: receiving, by a control plane network device, a session establishment request message, where the session establishment request message is used to establish a session connection for a request of a terminal device; determining, by the control plane network device based on service information that is requested by the terminal device and that is carried in the session establishment request message and based on service capability information of a first user plane network device, whether the first user plane network device is capable of allocating an IP address for the terminal device; and if the first user plane network device is capable of allocating the IP address for the terminal device, sending, by the control plane network device, an address allocation indication to the first user plane network device.

When receiving the session establishment request message, the control plane network device may determine whether the first user plane network device is capable of allocating the IP address for the terminal device. If the first user plane network device is capable of allocating the IP address for the terminal device, the control plane network device may send the address allocation indication to the first user plane network device. In this way, which device allocates the IP address may be determined, and a case in which two devices allocate an IP address for one terminal device at the same time is avoided, thereby avoiding an IP address conflict.

With reference to the first aspect, in a first possible implementation of the first aspect, the determining whether the first user plane network device is capable of allocating an IP address for the terminal device includes: determining, by the control plane network device based on the service information, a service requested by the terminal device; and determining, by the control plane network device based on the service capability information, whether the first user plane network device is capable of allocating an IP address for the service requested by the terminal device.

A manner of determining whether the first user plane network device is capable of allocating the IP address for the terminal device is provided.

With reference to the first aspect or the first possible implementation of the first aspect, in a second possible implementation of the first aspect, the method further includes: receiving, by the control plane network device, the service capability information of the first user plane network device sent by the first user plane network device; or obtaining, by the control plane network device, pre-configure service capability information of the first user plane network device.

The control plane network device may obtain the service capability information of the first user plane network device in different manners, and this is relatively flexible.

With reference to the first aspect or the first possible implementation or the second possible implementation of the first aspect, in a third possible implementation of the first aspect, the address allocation indication includes address allocation manner information, and the address allocation manner information is used to indicate a manner in which the first user plane network device is to allocate the IP address for the terminal device.

The address allocation indication may further carry the address allocation manner information, such that the first user plane network device can determine which manner should be used to allocate the IP address for the terminal device, in order to effectively reduce a probability of an allocation error.

With reference to the third possible implementation of the first aspect, in a fourth possible implementation of the first aspect, the control plane network device obtains, by resolving the session establishment request message, the address allocation manner information carried in the session establishment request message.

To be more specific, the control plane network device may obtain the address allocation manner information using the session establishment request message sent by the terminal device, and the address allocation manner information obtained in such a manner is more representative of an intention of the terminal device.

With reference to any one of the first aspect, or the first possible implementation to the fourth possible implementation of the first aspect, in a fifth possible implementation of the first aspect, the address allocation indication further includes the service information requested by the terminal device.

The address allocation indication may further include the service information requested by the terminal device, such that the first user plane network device allocates the IP address for the terminal device.

With reference to any one of the first aspect, or the first possible implementation to the fifth possible implementation of the first aspect, in a sixth possible implementation of the first aspect, the address allocation indication further includes indication information, and the indication information is used to instruct the first user plane network device to allocate the IP address for the terminal device.

The address allocation indication may explicitly instruct the first user plane network device to allocate the IP address for the terminal device. In this way, the first user plane network device can quickly determine a task to be performed by the first user plane network device, and an indication manner is relatively clear and easy to understand.

According to a second aspect, a second IP address allocation method is provided, including: receiving, by a user plane network device, an address allocation indication of a control plane network device; determining, by the user plane network device based on address allocation manner information included in the address allocation indication, a manner of allocating an IP address for the terminal device; and allocating, by the user plane network device, the IP address for the terminal device based on the determined manner.

The control plane network device may send the address allocation indication to a first user plane network device, in order to indicate a manner in which the first user plane network device is to allocate the IP address for the terminal device. In this way, which device allocates the IP address may be determined, avoiding a case in which two devices allocate an IP address for one terminal device at the same time, thereby avoiding an IP address conflict. In addition, a manner of allocating the IP address for the terminal device by the first user plane network device may be explicitly indicated, in order to help the first user plane network device perform an operation.

With reference to the second aspect, in a first possible implementation of the second aspect, the method further includes sending, by the user plane network device, service capability information of the user plane network device to the control plane network device.

The user plane network device may send the service capability information of the user plane network device to the control plane network device, such that the control plane network device determines whether the user plane network device can allocate the IP address for the corresponding terminal device.

With reference to the second aspect or the first possible implementation of the second aspect, in a second possible implementation of the second aspect, the address allocation indication further includes indication information, and the indication information is used to instruct the user plane network device to allocate the IP address for the terminal device.

The control plane network device may instruct, in an explicit indication manner, the user plane network device to allocate the IP address for the terminal device. As such, the user plane network device can gain a timely understanding.

With reference to the second aspect or the first possible implementation or the second possible implementation of the second aspect, in a third possible implementation of the second aspect, if the manner of allocating the IP address for the terminal device is allocating the IP address by the user plane network device in a process of establishing a default bearer, and the address allocation indication further includes service information, the allocating, by the user plane network device, the IP address for the terminal device based on the determined manner includes: allocating, by the user plane network device, the IP address for the terminal device based on the service information; and sending, by the user plane network device, a session response message to the control plane network device, where the session response message carries the IP address.

If the address allocation manner information is used to instruct the user plane network device to allocate the IP address in the process of establishing the default bearer, the user plane network device may carry, in the session response message, the IP address allocated to the terminal device. The user plane network device can determine, using the address allocation manner information, when to allocate the IP address for the terminal device.

With reference to the second aspect or the first possible implementation or the second possible implementation of the second aspect, in a fourth possible implementation of the second aspect, if the manner of allocating the IP address for the terminal device is allocating the IP address by the user plane network device after a default bearer is established, the allocating, by the user plane network device, the IP address for the terminal device based on the determined manner includes: receiving, by the user plane network device, a request message that is sent by the terminal device using a user plane connection, where the request message carries service information requested by the terminal device; allocating, by the user plane network device, the IP address for the terminal device based on the service information; and sending, by the user plane network device, the IP address for the terminal device using the user plane connection.

If the address allocation manner information is used to instruct the user plane network device to allocate the IP address in the process of establishing the default bearer, the user plane network device may allocate the IP address for the terminal device after receiving the request message sent by the terminal device. The user plane network device can determine, using the address allocation manner information, when to allocate the IP address for the terminal device.

With reference to the third possible implementation or the fourth possible implementation of the second aspect, in a fifth possible implementation of the second aspect, the allocating, by the user plane network device, the IP address for the terminal device based on the service information includes: determining, by the user plane network device using the service information, a server that allocates the IP address for the terminal device; sending, by the user plane network device, an address allocation request message to the server, where the address allocation request message is used to request to allocate the IP address for the terminal device; and receiving, by the user plane network device, the IP address that is allocated to the terminal device and that is sent by the server.

The user plane network device may determine, using the service information carried in the request message, the server that allocates the IP address for the terminal device, and then request the server to allocate the IP address for the terminal device, such that accuracy is relatively high.

With reference to the fifth possible implementation of the second aspect, in a sixth possible implementation of the second aspect, the determining, by the user plane network device using the service information, a server that allocates the IP address for the terminal device includes: determining, by the user plane network device using the service information, that the server that allocates the IP address for the terminal device is a Dynamic Host Configuration Protocol (DHCP) server. Additionally, the sending, by the user plane network device, an address allocation request message to the server includes: sending, by the user plane network device, the address allocation request message to the DHCP server based on a configured address of the DHCP server.

With reference to the fifth possible implementation of the second aspect, in a seventh possible implementation of the second aspect, the determining, by the user plane network device using the service information, a server that allocates the IP address for the terminal device includes: determining, by the user plane network device using the service information, that the server that allocates the IP address for the terminal is a Layer 2 Tunneling Protocol (L2TP) network server (LNS). Additionally, the sending, by the user plane network device, an address allocation request message to the server includes: establishing, by the user plane network device, an L2TP link to the LNS based on a configured address of the LNS; and sending, by the user plane network device, the address allocation request message to the LNS using the L2TP link.

With reference to the fifth possible implementation of the second aspect, in an eighth possible implementation of the second aspect, the determining, by the user plane network device using the service information, a server that allocates the IP address for the terminal device includes: determining, by the user plane network device using the service information, that the server that allocates the IP address for the terminal device is an Authentication, Authorization and Accounting (AAA) server. Additionally, the sending, by the user plane network device, an address allocation request message to the server includes: sending, by the user plane network device, the address allocation request message to the AAA server based on a configured address of the AAA server.

The foregoing provides several manners in which the user plane network device allocates the IP address for the terminal device using an external server. The user plane network device may request more external servers and have more abundant resources. In addition, the user plane network device may initiate a request to different servers based on the service information, such that an allocation result better meets a requirement of the terminal device.

According to a third aspect, a control plane network device is provided, including: a receiver configured to receive a session establishment request message, where the session establishment request message is used to establish a session connection for a request of a terminal device; and a processor configured to: determine, based on service information that is requested by the terminal device and that is carried in the session establishment request message and based on service capability information that a first user plane network device is able to provide, whether the first user plane network device is capable of allocating an IP address for the terminal device, and if the first user plane network device is capable of allocating the IP address for the terminal device, send an address allocation indication to the first user plane network device.

With reference to the third aspect, in a first possible implementation of the third aspect, the processor is configured to: determine, based on the service information, a service requested by the terminal device; and determine, based on the service capability information, whether the first user plane network device is capable of allocating an IP address for the service requested by the terminal device.

With reference to the third aspect or the first possible implementation of the third aspect, in a second possible implementation of the third aspect, the receiver is further configured to receive the service capability information of the first user plane network device sent by the first user plane network device. Alternatively, the processor is further configured to obtain pre-configure service capability information of the first user plane network device.

With reference to the third aspect or the first possible implementation or the second possible implementation of the third aspect, in a third possible implementation of the third aspect, the address allocation indication includes address allocation manner information, and the address allocation manner information is used to indicate a manner in which the first user plane network device is to allocate the IP address for the terminal device.

With reference to the third possible implementation of the third aspect, in a fourth possible implementation of the third aspect, the processor is further configured to: obtain, by resolving the session establishment request message, the address allocation manner information carried in the session establishment request message.

With reference to any one of the third aspect, or the first possible implementation to the fourth possible implementation of the third aspect, in a fifth possible implementation of the third aspect, the address allocation indication further includes the service information requested by the terminal device.

With reference to any one of the third aspect, or the first possible implementation to the fifth possible implementation of the third aspect, in a sixth possible implementation of the third aspect, the address allocation indication further includes indication information, and the indication information is used to instruct the first user plane network device to allocate the IP address for the terminal device.

According to a fourth aspect, a user plane network device is provided, including a first receiver configured to receive an address allocation indication of a control plane network device. The user plane network device further includes a processor configured to: determine, based on address allocation manner information included in the address allocation indication, a manner of allocating an IP address for the terminal device; and allocate the IP address for the terminal device based on the determined manner.

With reference to the fourth aspect, in a first possible implementation of the fourth aspect, the user plane network device further includes a first transmitter. The first transmitter is configured to send service capability information of the user plane network device to the control plane network device.

With reference to the fourth aspect or the first possible implementation of the fourth aspect, in a second possible implementation of the fourth aspect, the address allocation indication further includes indication information, and the indication information is used to instruct the first user plane network device to allocate the IP address for the terminal device.

With reference to the fourth aspect or the first possible implementation or the second possible implementation of the fourth aspect, in a third possible implementation of the fourth aspect, if the manner of allocating the IP address for the terminal device is allocating the IP address by the user plane network device in a process of establishing a default bearer, and the address allocation indication further includes service information, the processor is configured to: allocate the IP address for the terminal device based on the service information; and send a session response message to the control plane network device using the first transmitter, where the message carries the IP address.

With reference to the fourth aspect, or the first possible implementation or the second possible implementation of the fourth aspect, in a fourth possible implementation of the fourth aspect, the user plane network device further includes a second receiver and a second transmitter; and if the manner of allocating the IP address for the terminal device is allocating the IP address by the user plane network device after a default bearer is established, the processor is configured to: receive, using the second receiver, a request message that is sent by the terminal device using a user plane connection, where the request message carries service information requested by the terminal device; allocate the IP address for the terminal device based on the service information; and send the IP address for the terminal device using the second transmitter and the user plane connection.

With reference to the third possible implementation or the fourth possible implementation of the fourth aspect, in a fifth possible implementation of the fourth aspect, the user plane network device further includes a third receiver and a third transmitter, and the processor is configured to: determine, using the service information, a server that allocates the IP address for the terminal device; send an address allocation request message to the server using the third transmitter, where the address allocation request message is used to request to allocate the IP address for the terminal device; and receive, using the third receiver, the IP address that is allocated to the terminal device and that is sent by the server.

With reference to the fifth possible implementation of the fourth aspect, in a sixth possible implementation of the fourth aspect, the processor is configured to: determine, using the service information, that the server that allocates the IP address for the terminal device is a DHCP server; and send the address allocation request message to the DHCP server using the third transmitter based on a configured address of the DHCP server.

With reference to the fifth possible implementation of the fourth aspect, in a seventh possible implementation of the fourth aspect, the processor is configured to: determine, using the service information, that the server that allocates the IP address for the terminal is an LNS; establish an L2TP link to the LNS based on a configured address of the LNS; and send the address allocation request message to the LNS using the third transmitter and the L2TP link.

With reference to the fifth possible implementation of the fourth aspect, in an eighth possible implementation of the fourth aspect, the processor is configured to: determine, using the service information, that the server that allocates the IP address for the terminal device is an AAA server; and send the address allocation request message to the AAA server using the third transmitter based on a configured address of the AAA server.

According to a fifth aspect, a network system is provided, including the control plane network device in the fourth aspect and the user plane network device in the fifth aspect.

According to a sixth aspect, another control plane network device is provided, including a module configured to implement the method in the first aspect.

According to a seventh aspect, another user plane network device is provided, including a module configured to implement the method in the second aspect.

According to an eighth aspect, another network system is provided, including the control plane network device in the sixth aspect and the user plane network device in the seventh aspect.

When receiving the session establishment request message, the control plane network device may determine whether the first user plane network device is capable of allocating the IP address for the terminal device. If the first user plane network device is capable of allocating the IP address for the terminal device, the control plane network device may send the address allocation indication to the first user plane network device. In this way, which device allocates the IP address may be determined, and a case in which two devices allocate an IP address for one terminal device at the same time is avoided, thereby avoiding an IP address conflict.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
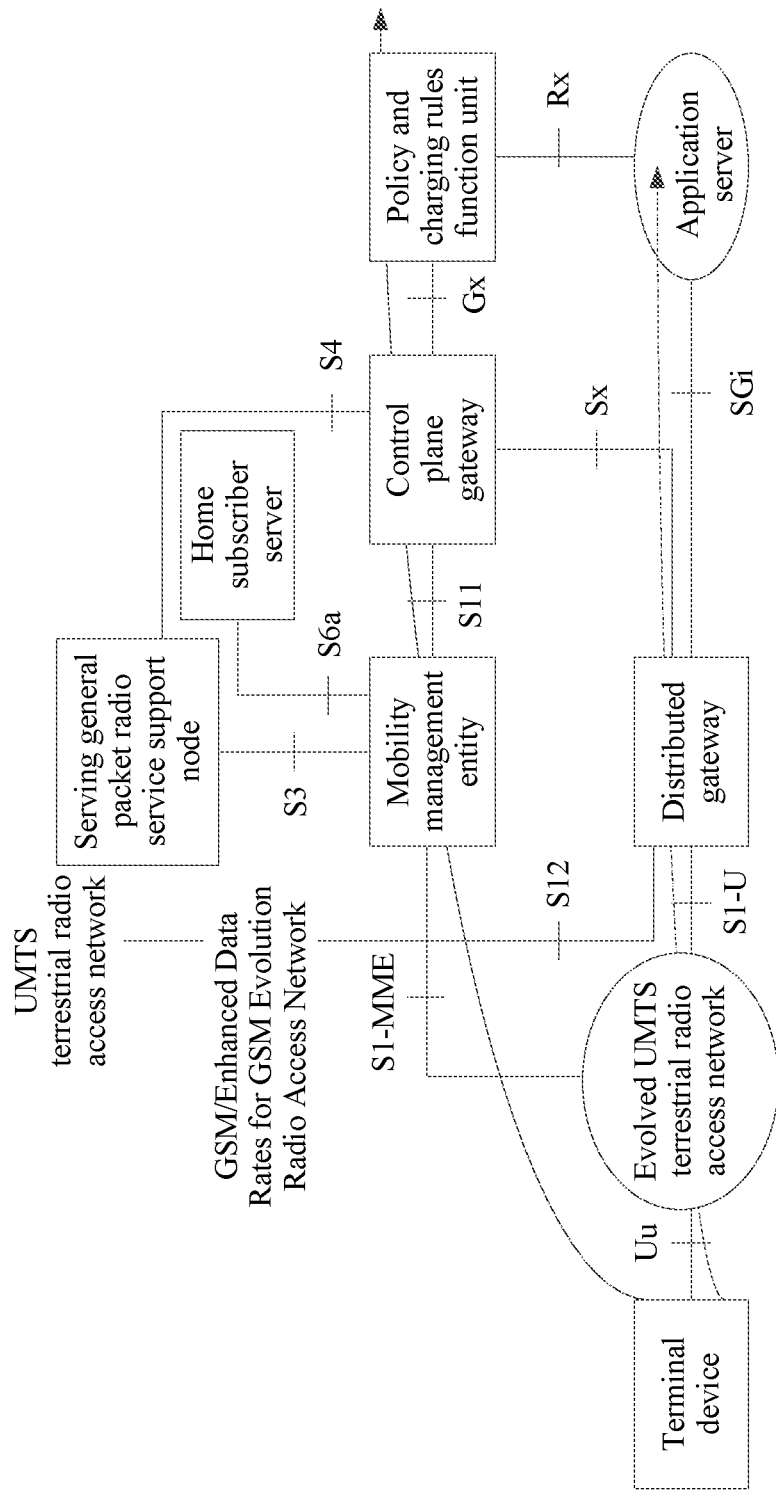
FIG. 1 is a first network architectural diagram in which a user plane and a control plane are separated in an Evolved Packet System (EPS) according to an embodiment of the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the embodiments of the present disclosure.

Technologies described in this specification may be applied to various communications systems, for example, a Long-Term Evolution (LTE) system, a 4.5G system, or a 5G system, and other communications systems or future evolution systems. The technical solutions provided in this specification are not only applicable to a 3rd Generation Partnership Project (3GPP) access manner, but also applicable to a case of separating a control plane from a user plane in a non-3GPP access manner.

In the following, some terms in the embodiments of the present disclosure are described, in order to help a person skilled in the art have a better understanding.

(1) A terminal device is a device that provides a user with voice and/or data connectivity, for example, may be a handheld device with a wireless connection function, or a processing device connected to a wireless modem. The terminal device may communicate with a core network using a radio access network (RAN), and exchange voice and/or data with the RAN. The terminal device may include a UE, a wireless terminal device, a mobile terminal device, a subscriber unit, a subscriber station, a mobile station, a remote station, an access point (AP), a remote terminal device, an access terminal device (Access Terminal), a user terminal device (User Terminal), a user agent, or a user device. For example, the terminal device may include a mobile phone (or referred to as a "cellular" phone), a computer having a mobile terminal device, a dedicated terminal device in a Narrowband Internet-of-Things (NB-IoT), or a portable, pocket-sized, handheld, computer built-in, or in-vehicle mobile apparatus. For example, the terminal device may include a device such as a personal communications service (PCS) phone, a cordless telephone set, a Session Initiation Protocol (SIP) phone, a wireless local loop (WLL) station, or a personal digital assistant (PDA).

(2) A network device may include, for example, a control plane network device and a user plane network device.

In a network architecture of separating the control plane from the user plane (or referred to as a forwarding plane), for example, in a network architecture, the control plane network device may include, for example, a control plane gateway (CGW), or in a future communications system (such as a 5G system), a current mobility management entity (MIME) and the CGW (or including another device) may be combined to form a new control plane network device, or may include another possible network device configured to implement a control plane function. Alternatively, for example, in another network architecture, the control plane network device may include, for example, a control plane network element of a P-GW, for example, the network element is referred to as a control plane P-GW (PGW-C), or may include another possible network device configured to implement the control plane function.

In the network architecture of separating the control plane from the user plane, for example, in a network architecture, the user plane network device may include, for example, a user plane gateway or a user plane gateway deployed closer to users (or in a distributed manner), referred to as a distributed gateway (DGW), or may include another possible network device configured to implement a user plane function. Alternatively, for example, in another network architecture, the user plane network device may include, for example, a user plane network function element of the P-GW, for example, the network element is referred to as a user plane P-GW (PGW-U), or may include another possible network device configured to implement the user plane function.

(3) The terms "system" and "network" may be used interchangeably in the embodiments of the present disclosure. "A plurality of" means two or more than two. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects unless specified otherwise.

The network architecture applied in the embodiments of the present disclosure is an architecture of separating the control plane from the user plane, and the following gives a description with reference to the accompanying drawings.

In the embodiments of the present disclosure, when the terminal device may access a public mobile network or a dedicated network of a specific application (such as an Internet service provider (ISP) or an enterprise network), the embodiments of the present disclosure are mainly intended to resolve a problem of allocating an IP address for the terminal device in this scenario.

The following describes the network architecture in the embodiments of the present disclosure. When the network architecture is described, an evolved packet system (EPS) is used as an example. However, the embodiments of the present disclosure are not limited to this system.

A DGW architecture is an enhanced network architecture that is proposed on top of an existing EPS network architecture based on an idea of separating the control plane function of the network from the user plane function of the network. The DGW architecture includes the CGW and the user plane gateway (UGW).

Figure 2:
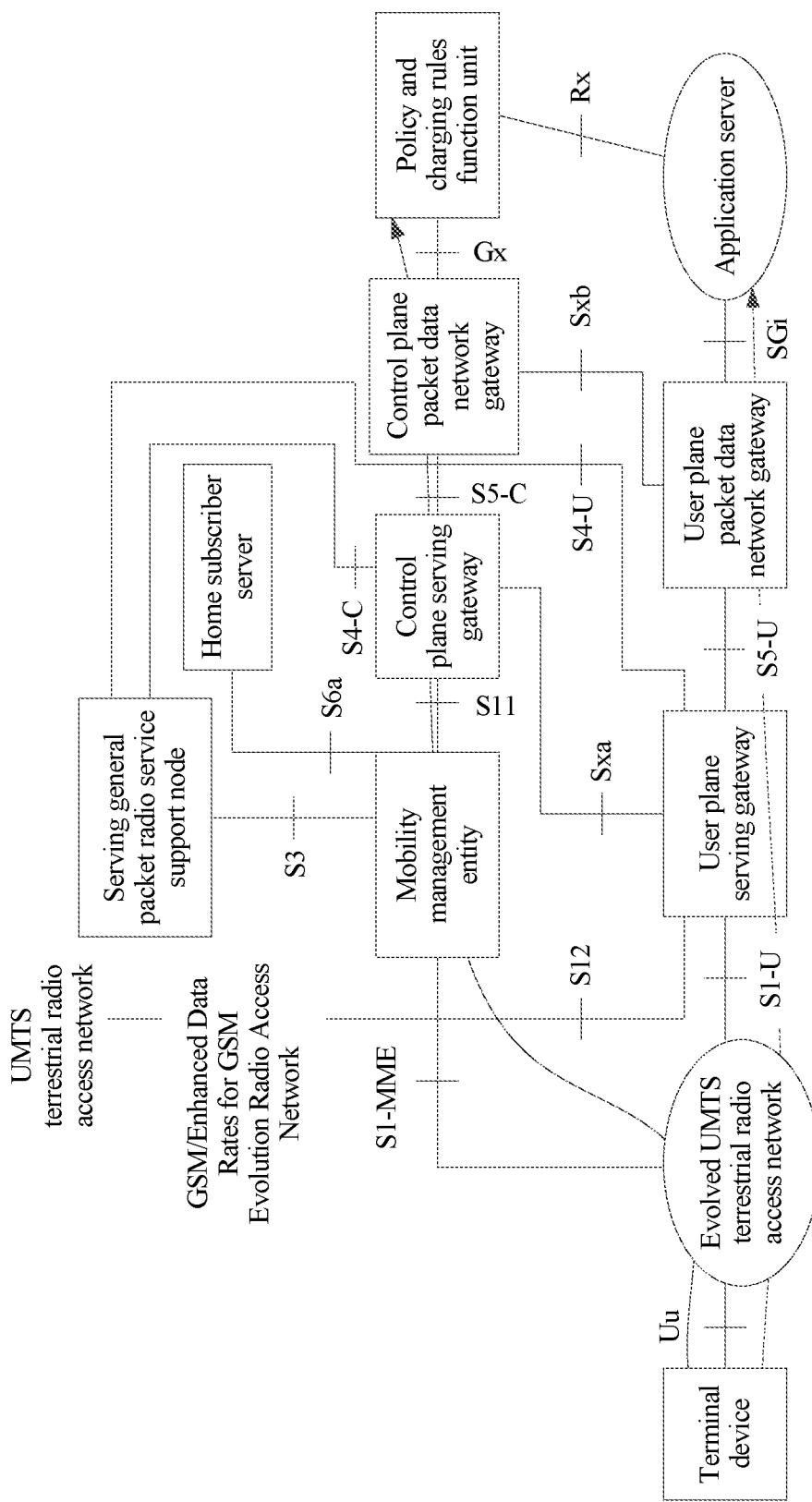
FIG. 2 is a second network architectural diagram in which a user plane and a control plane are separated in an EPS system according to an embodiment of the present disclosure.

The CGW is a centralized control plane gateway and may be implemented in two forms: (1) integrating network elements of the control plane functions of a serving gateway (S-GW) and a packet data network gateway (P-GW) in an existing 3GPP-defined EPS network, as shown in FIG. 1; (2) including two separate network elements for respectively implementing a control plane function of the existing S-GW (Control Plane S-GW) and a control plane function of the existing P-GW (Control Plane P-GW), for example, a network element for implementing the control plane function of the existing S-GW is referred to as a control plane S-GW, and a network element for implementing the control plane function of the existing P-GW is referred to as the control plane P-GW, as shown in FIG. 2.

The CGW may be specially configured to process control plane signaling in the EPS network, and may implement functions such as mobility management, session management, address management, path management, and charging management. The CGW interacts with the UGW to control and manage user plane data processing.

The PGW-C is a control plane functional entity of the P-GW and inherits the control plane function of the P-GW, such as a charging policy and charging control.

The UGW is a distributed user plane gateway and corresponds to two implementation forms of the CGW. The UGW is also implemented in two forms: (1) integrating network elements of user plane functions of the S-GW and P-GW in the existing EPS network, as shown in FIG. 1; (2) including two separate network elements for respectively implementing a user plane function of the existing S-GW (User Plane S-GW) and a user plane function of the existing P-GW (User Plane P-GW), for example, a network element for implementing the user plane function of the existing S-GW is referred to as a user plane S-GW, and a network element for implementing the user plane function of the existing P-GW is referred to as the user plane P-GW, as shown in FIG. 2.

The UGW is specially configured to process user plane data in the EPS network, and may implement functions such as routing and forwarding, packet inspection, packet statistics, and quality of service execution. The UGW processes the user plane data under control and management of the CGW. In addition, the UGW may also be referred to as the DGW considering a feature that the UGW may be deployed in a distributed manner.

The PGW-U is a user functional entity of the P-GW and inherits the user plane function of the P-GW, such as charging information statistics.

FIG. 1 is a network architectural diagram when a CGW and a UGW are implemented in respective first forms. In FIG. 1, a UE is connected to an evolved universal terrestrial radio access network (E-UTRAN) using a Uu interface, and the E-UTRAN is connected to a DGW using an S1-U interface. The CGW is connected to the DGW using an Sx interface, and the DGW is connected to a Global System for Mobile Communications (GSM)/Enhanced Data Rates for GSM Evolution Radio Access Network (GERAN) and a Universal Mobile Telecommunications Service (UMTS) terrestrial radio access network (UTRAN) using an S12 interface. The E-UTRAN is connected to an MME using an S1-MME interface, and the MME is connected to the CGW using an S11 interface. The MME is connected to a serving general packet radio service support node (SGSN) using an S3 interface, and the MME is connected to a home subscriber server (HSS) using an S6a interface. The CGW is connected to a policy and charging rules function (PCRF) unit using a Gx interface, and the PCRF is connected to an application server or a packet data network using an Rx interface (the application server is used as an example in FIG. 1), for example, the application server may include an IP multimedia subsystem (IMS) or a packet switching service (PSS).

The interface between the CGW and the DGW, interfaces between the CGW and other devices, and interfaces between the DGW and other devices are merely an example in FIG. 1, and other interfaces may also be used.

In the architecture of FIG. 1, a signaling stream of a control plane is shown by a solid line arrow, and a signaling stream of a user plane is shown by a dashed line arrow.

FIG. 2 is a network architectural diagram when a CGW and a UGW are implemented in respective second forms. In FIG. 2, a UE is connected to an E-UTRAN using a Uu interface, and the E-UTRAN is connected to an SGW-U using an S1-U interface. The SGW-U is connected to the SGW-C using an Sxa interface, and the SGW-U is connected to a GERAN and a UTRAN using an S12 interface. The E-UTRAN is connected to an MME using an S1-MME interface, and the MME is connected to an SGW-C using an S11 interface. The SGW-C is connected to a PGW-C using an S5-C interface. The PGW-C is connected to a PCRF using a Gx interface, and the PGW-C is connected to the PGW-U using an Sxb interface. The PCRF is connected to an application server or a packet data network using an Rx interface (the application server is used as an example in FIG. 2), and the PGW-U is connected to the application server or the packet data network using an SGi interface (the application server is used as an example in FIG. 2), for example, the application server may include an IMS or a PSS.

Interfaces between devices such as the SGW-C, the SGW-U, the PGW-C, and the PGW-C, and interfaces between these devices and other devices are merely an example in FIG. 2, and other interfaces may also be used.

In the architecture of FIG. 2, a signaling stream of a control plane is shown by a solid line arrow, and a signaling stream of a user plane is shown by a dotted line arrow.

The solutions provided in the embodiments of the present disclosure are described below with reference to the accompanying drawings.

Figure 3:
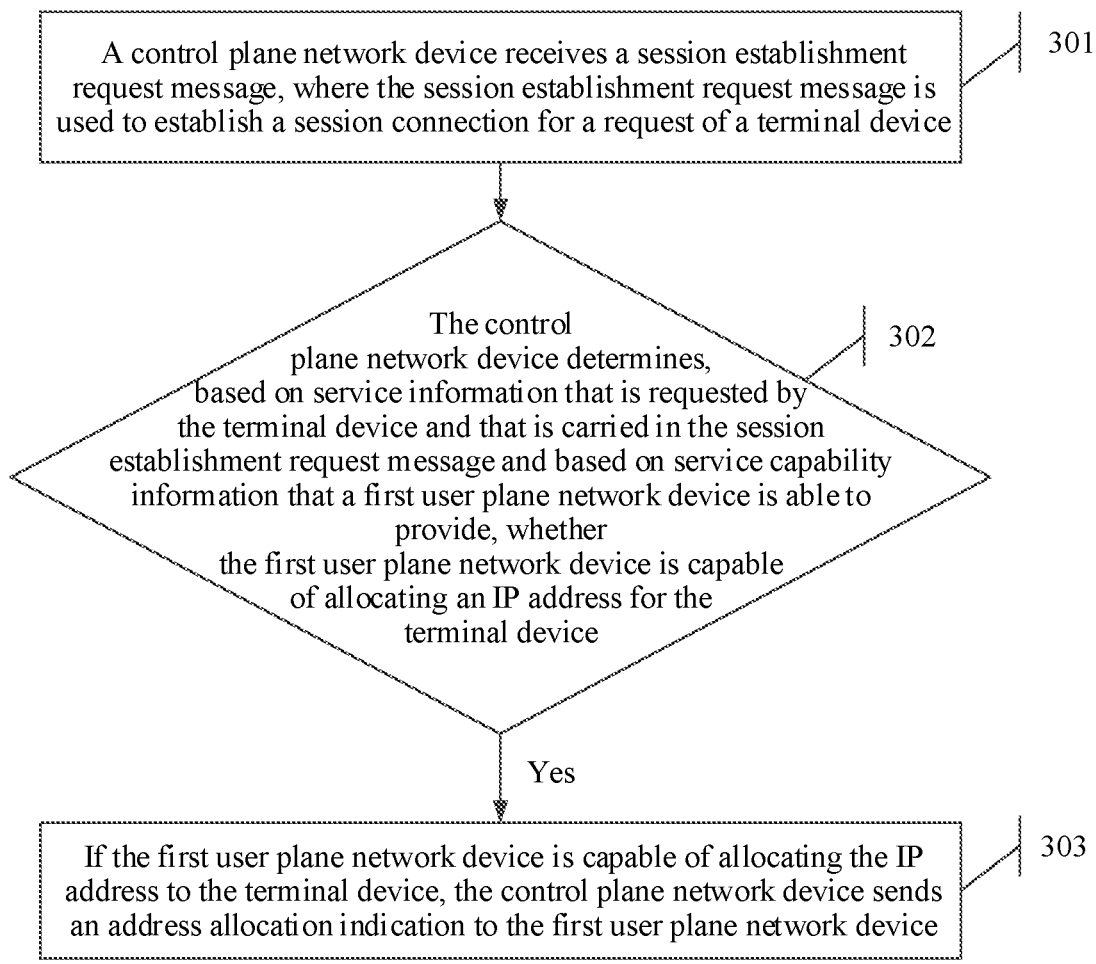
FIG. 3 is a flowchart of a first IP address allocation method according to an embodiment of the present disclosure.

Referring to FIG. 3, a first IP address allocation method is provided, and a procedure of the method is described as follows.

Step 301. A control plane network device receives a session establishment request message, where the session establishment request message is used to establish a session connection for a request of a terminal device.

Step 302. The control plane network device determines, based on service information that is requested by the terminal device and that is carried in the session establishment request message and based on service capability information that a first user plane network device is able to provide, whether the first user plane network device is capable of allocating an IP address for the terminal device.

Step 303. If the first user plane network device is capable of allocating the IP address for the terminal device, the control plane network device sends an address allocation indication to the first user plane network device.

If the control plane network device determines that the first user plane network device is incapable of allocating the IP address for the terminal device, the control plane network device may not instruct the first user plane network device to allocate the IP address for the terminal device. In this case, for example, the control plane network device may voluntarily allocate the IP address for the terminal device.

Figure 4:
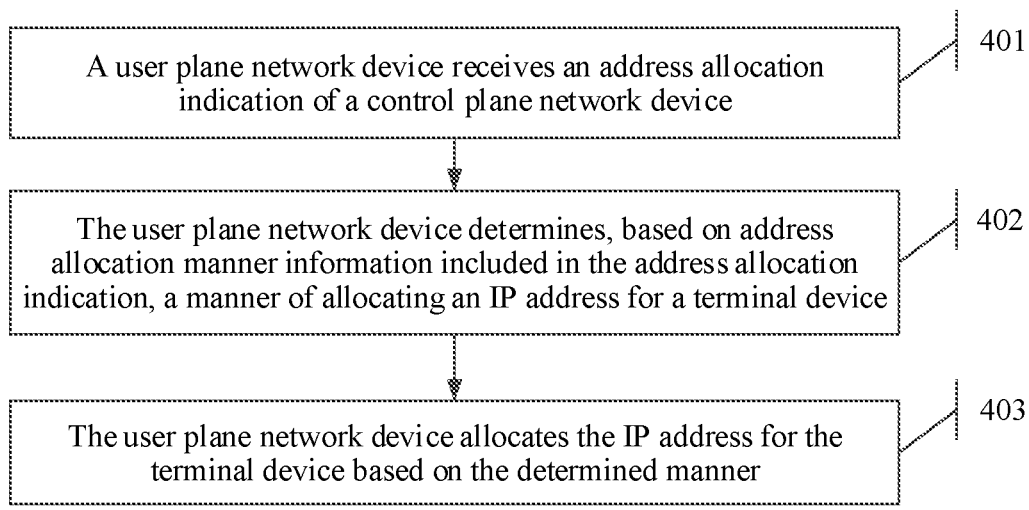
FIG. 4 is a flowchart of a second IP address allocation method according to an embodiment of the present disclosure.

Referring to FIG. 4, a second IP address allocation method is provided, and a procedure of the method is described as follows.

Step 401. A user plane network device receives an address allocation indication of a control plane network device.

Step 402. The user plane network device determines, based on address allocation manner information included in the address allocation indication, a manner of allocating an IP address for a terminal device.

Step 403. The user plane network device allocates the IP address for the terminal device based on the determined manner.

Figure 5:
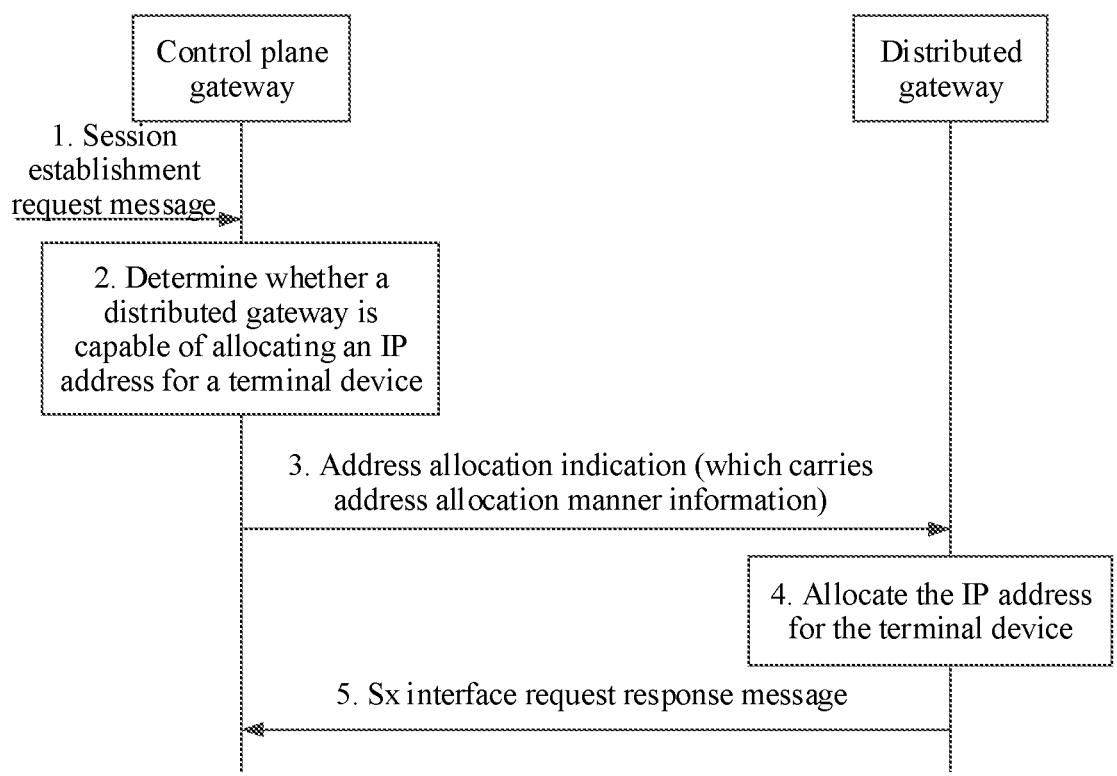
FIG. 5 is a first flowchart of allocating an IP address by a DGW according to an embodiment of the present disclosure.

FIG. 3 and FIG. 4 show corresponding methods, which are described together below. For example, FIG. 3 and FIG. 4 may be implemented based on the architecture in FIG. 1, or FIG. 3 and FIG. 4 may be implemented based on the architecture in FIG. 2. The following uses an example in which FIG. 3 and FIG. 4 are implemented based on the architecture in FIG. 1 for description. Similarly, if FIG. 3 and FIG. 4 are implemented based on the architecture in FIG. 2, a PGW-C and a PGW-U are used to respectively replace a CGW and a DGW in FIG. 5. In addition, step 1 in FIG. 5 is replaced with a step in which an SGW-C sends a session establishment request to the PGW-C, and other steps are similar. Therefore, details are not described herein again.

Optionally, the CGW needs to know service capability information that the DGW is able to provide. The service capability information that the DGW is able to provide may include a particular service to which the DGW is capable of allocating an IP address, for example, the terminal device requests a service type 1. If the DGW is capable of allocating an IP address for the service type 1, the DGW may allocate the IP address for the service type 1. The CGW may obtain the service capability information of the DGW in different manners. The following describes several possible manners.

In a first manner, the DGW sends, to the CGW, the service capability information indicating that the DGW is capable of allocating the IP address.

Optionally, when the DGW is powered on and starts, the DGW generally initiates an Sx interface (an Sx interface is an interface used between the CGW and the DGW) startup procedure. For example, the DGW sends an Sx setup request message to the CGW. Then, the DGW may add the service capability information to the Sx setup request message, for example, may add a field to the Sx setup request message to indicate the service capability information of the DGW. For example, the field may be an IP allocation capability.

After receiving the Sx setup request message that carries the IP allocation capability, the CGW may save a DGW identifier carried in the Sx setup request message and the IP allocation capability carried in the Sx setup request message, and may return an Sx setup response message to the DGW. In this way, the CGW knows the service capability information of the DGW.

Alternatively, optionally, the DGW may also send the service capability information to the CGW using an event report message. For example, after the Sx interface starts, when the DGW sends the event report message to the CGW, the DGW may add the service capability information of the DGW to one or more of event report messages, or may add, for example, a field to the event report message to indicate the service capability information of the DGW. For example, the field may be an IP allocation capability.

Optionally, the IP allocation capability may be used to indicate an APN, an external server associated with the APN, or local address pool information of the DGW, or may include other indication information that may indicate that the DGW has the IP address allocation capability.

In a second manner, the service capability information of the DGW is preconfigured in the CGW.

For example, the service capability information of the DGW may be configured in the CGW in an operation, administration and maintenance (OAM) manner.

Optionally, for example, the service capability information configured in the CGW includes the following.

(1) Service information supported by the DGW and IP address allocation information indicating whether the DGW supports the service information are configured in the CGW. In this case, the CGW may determine, based on the service information requested by the terminal device and the locally stored service capability information of the DGW, whether the DGW has a service capability to allocate the IP address for the service information requested by the terminal device. To be more specific, the CGW may search for the locally stored service capability information of the DGW, in order to determine whether there is a DGW to allocate the IP address for the service information requested by the terminal device.

(2) Service information or a service area identifier corresponding to an enterprise network is configured in the CGW (for example, it is stipulated that the DGW allocates an IP address for an enterprise network service). In this case, the CGW may determine, based on the service information requested by the terminal device, whether a service initiated by the terminal device is an enterprise network service, or the CGW may determine, based on location information (such as a cell identifier (Cell ID) or a base station identifier (e.g., an eNodeB (eNB) ID)) of the terminal device, whether a dedicated enterprise network is accessed by the terminal device (to be more specific, the CGW determines whether a cell on which the terminal device camps is a serving cell of the enterprise network, or determines whether a base station connected to the terminal device is a base station serving a particular enterprise network), and determine, based on the foregoing determining result, whether to instruct the DGW to allocate the IP address for the terminal device. For example, if the terminal device accesses the dedicated enterprise network, it is determined that the DGW is instructed to allocate the IP address for the terminal device. If it is determined that the terminal device does not access the enterprise dedicated network, it is determined that the CGW allocates the IP address for the terminal device. In other words, the DGW is not instructed to allocate the IP address for the terminal device, and so on.

Optionally, the service information requested by the terminal device may include an access point name (APN) requested by the terminal device, and the APN may be used to indicate a service type, and may further include other service-related information requested by the terminal device. The service capability information of the DGW may include capability information indicating that the DGW allocates an IP address to the APN, for example, may indicate a particular APN to which the DGW is capable of allocating an IP address, and may further include other service-related capability information of the DGW.

The following uses some examples to describe a process of allocating the IP address by the DGW.

Example 1

Refer to FIG. 5.

1. In an attachment procedure of a terminal device or a PDN connection procedure requested by the terminal device, the terminal device sends an attachment request or a PDN connection establishment request message to an access network device (such as a base station), and the access network device sends the attachment request or the PDN connection establishment request message to an MIME. The MME may perform authentication on the terminal device. If the authentication succeeds, the MME may initiate a session establishment procedure to a core network device. For example, the MIME may send a session establishment request message to a CGW (in FIG. 5, an arrow is used to indicate that the CGW receives the session establishment request message in the process, and devices such as the access network device and the MIME are not shown), and the session establishment request message may carry an APN, a protocol configuration option (PCO), location information of the terminal device, and the like. The APN carried in the session establishment request message may be used to indicate a service type requested by the terminal device. The PCO may include an allocation manner of an IP address requested by the terminal device, in other words, may include address allocation manner information indicating that the IP address is allocated to the terminal device. The location information of the terminal device may include any one or combination of the following: an identifier of a cell on which the terminal device camps, a tracking area identity (TAI), and an identifier of the base station accessed by the terminal device. For example, the identifier of the cell on which the terminal device camps may include an E-UTRAN cell global identifier (ECGI), and the identifier of the base station accessed by the terminal device may include an eNB ID of the base station accessed by the terminal device.

This embodiment of the present disclosure focuses on IP address allocation. Therefore, for numerous parameter information included in the PCO, this embodiment of the present disclosure focuses only on the address allocation manner information, and other parameter information included in the PCO is not repeated. For example, the address allocation manner information may be implemented using Address Allocation Preference included in the PCO. Address Allocation Preference may generally include two values, which respectively are IP address allocation via non-access stratum (NAS) signaling and IP version 4 (IPv4) address allocation via DHCPv4. If a value of Address Allocation Preference is IP address allocation via non-access stratum signaling, it indicates that when the terminal device is attached to a network, a network device allocates the IP address for the terminal device in a process of establishing a default bearer for the terminal device. If a value of Address Allocation Preference is IPv4 address allocation via DHCPv4, it indicates that a network device allocates the IP address to the terminal device after establishing a default bearer for the terminal device.

2. The CGW determines, based on the APN carried in the session establishment request message and locally stored service capability information of a DGW, whether the DGW has a capability to allocate an IP to the APN requested by the terminal device, in other words, whether the DGW is capable of allocating the IP address for the terminal device.

One CGW may be connected to a plurality of DGWs. In this case, after receiving a session establishment request, the CGW needs to select one DGW for the terminal device, to provide a service for the terminal device. When selecting the DGW, the CGW needs to determine whether the selected DGW has a capability to allocate an IP to the APN requested by the terminal device. When selecting the DGW, the CGW may consider a plurality of factors, for example, may use the location information of the terminal as a consideration factor, and may further consider any one or combination of the following: the service type requested by the terminal device, current load of the DGW, a capability of the DGW (for example, including whether the DGW supports a deep packet inspection capability), and similar information, and may further consider other information. This is not limited in this embodiment of the present disclosure.

3. If it is determined that the DGW has a capability to allocate an IP to the APN requested by the terminal device, the CGW determines that the DGW allocates the IP address for the terminal device, and then the CGW sends an address allocation indication to the DGW.

Optionally, the address allocation indication may include the address allocation manner information, and the address allocation manner information may be used to indicate a manner in which the DGW allocates the IP address for the terminal device. The address allocation manner information is obtained by the CGW from the session establishment request message sent by the terminal device.

Optionally, the address allocation indication may further include indication information, and the indication information may be used to instruct the DGW to allocate the IP address for the terminal device.

In this embodiment of the present disclosure, a manner of the address allocation indication is not limited, provided that the DGW may determine, using the address allocation indication, whether the IP address is allocated by the DGW to the terminal device. For example, the address allocation indication may be implemented using some existing messages, for example, may be implemented using an Sx interface message, and the DGW may determine, using an existing information element in the address allocation indication, whether the IP address is allocated by the DGW to the terminal device, or the DGW may determine, using a newly-added information element in the address allocation indication, whether the IP address is allocated by the DGW to the terminal device. For example, in this embodiment of the present disclosure, an information element specially configured to indicate whether the DGW allocates the IP address for the terminal device may be newly added to the address allocation indication, and so on. To better understand the solutions in the embodiments of the present disclosure, the following uses two examples to describe different implementations of the address allocation indication.

In a first implementation, if the CGW determines that the IP address is allocated by the DGW to the terminal device, the CGW sends the address allocation indication for the terminal device to the DGW. Optionally, the address allocation indication may carry service information requested by the terminal device (for example, including the APN). Optionally, the address allocation indication may further carry the address allocation manner information (for example, including the PCO). Optionally, the address allocation indication may further carry the indication information, for example, the indication information is represented as an IP address allocation indication (IP allocation indication). The indication information may be used to instruct the DGW to allocate the IP address for the terminal device. For example, the address allocation indication may be implemented using an Sx interface request message, or may certainly be implemented using another possible message.

If the first implementation is used, in this case, if the CGW determines that the IP address cannot be allocated by the DGW to the terminal device, for example, the DGW may not have the capability to allocate the IP address to the APN requested by the terminal device, the CGW may send the APN to the DGW instead of sending the PCO and the indication information. In other words, the address allocation indication does not carry the address allocation manner information and the indication information.

After the DGW receives the address allocation indication sent by the CGW, if the address allocation indication carries the APN, the PCO, and the indication information, the DGW knows, by identifying the APN and the indication information that are carried in the address allocation indication, that the IP address is allocated by the DGW to the terminal device, and then allocates the IP address for the terminal device in a manner indicated by Address Allocation Preference in the PCO. However, if the address allocation indication does not carry the PCO and the indication information, the DGW knows that the IP address is not allocated by the DGW to the terminal device, and the DGW does not allocate the IP address for the terminal device, in order to avoid an IP address conflict.

This is an explicit indication manner. In this indication manner, the DGW can relatively quickly determine whether the IP address is allocated by the DGW to the terminal device, such that the indication manner brings a relatively good effect.

In a second implementation, if the CGW determines that the IP address is allocated by the DGW to the terminal device, the CGW may send the address allocation indication to the DGW. Optionally, the address allocation indication may carry the service information requested by the terminal device (for example, including the APN). Optionally, the address allocation indication may further carry the address allocation manner information (for example, including the PCO). For example, the address allocation indication may be implemented using the Sx interface request message, or may be implemented using the other possible message.

If the second implementation is used, in this case, if the CGW determines that the IP address cannot be allocated by the DGW to the terminal device, for example, the DGW may not have the capability to allocate the IP address to the APN requested by the terminal device, the CGW may send the APN to the DGW instead of sending the PCO. In other words, the address allocation indication does not carry the address allocation manner information.

After the DGW receives the address allocation indication sent by the CGW, if the address allocation indication carries the APN and the PCO, the DGW knows, by identifying the APN in the address allocation indication, that the IP address is allocated by the DGW to the terminal device, and then allocates the IP address for the terminal device in a manner indicated by Address Allocation Preference in the PCO. However, if the address allocation indication does not carry the PCO, the DGW knows that the IP address is not allocated by the DGW to the terminal device, and the DGW does not allocate the IP address for the terminal device, in order to avoid the IP address conflict.

Certainly, in addition to the two manners, the CGW may further add another possible message to the address allocation indication, to instruct the DGW, and this is not limited in this embodiment of the present disclosure.

The Sx interface request message described in step 3 may be the session establishment request message of an Sx interface, or may be a bearer establishment request message of the Sx interface, or may be another possible request message such as a session management request message.

4. The DGW receives the address allocation indication of the CGW. If the IP address is allocated by the DGW to the terminal device, the DGW allocates the IP address for the terminal device in a manner indicated by Address Allocation Preference in the PCO.

If the value of Address Allocation Preference is IP address allocation via NAS signaling, to be more specific, this is used to instruct the DGW to allocate the IP address for the terminal device in the process of establishing the default bearer, the DGW may allocate the IP address for the terminal device and need to add the allocated IP address for an Sx interface request response message when sending the Sx interface request response message to the CGW (this is used as an example in the example 1). If the value of Address Allocation Preference is IPv4 address allocation via DHCPv4, to be more specific, this is used to instruct the DGW to allocate the IP address for the terminal device after the default bearer is established, the DGW temporarily does not allocate the IP address for the terminal device. After the default bearer is established, the terminal device sends a request message to the DGW. The DGW may then allocate the IP address for the terminal device after subsequently receiving the request message.

When allocating the IP address for the terminal device, the DGW may send a request to an HSS and obtain the allocated IP address from the HSS. Alternatively, the DGW may allocate the IP address for the terminal device based on a local address pool, to be more specific, may select one IP address from the local address pool as the IP address allocated to the terminal device. Alternatively, the DGW may allocate the IP address for the terminal device using an external mechanism. The external mechanism may be that the DGW sends a request to an external server and requests the external server to allocate an IP address for the terminal device. After allocating the IP address for the terminal device, the external server sends the allocated IP address for the DGW. In this way, the DGW completes a process of allocating the IP address for the terminal device using the external mechanism.

Optionally, the DGW may allocate the IP address for the terminal device using different external mechanisms, for example, a Dynamic Host Configuration Protocol (DHCP) mechanism may be used to allocate the IP address for the terminal device, or a Remote Authentication Dial In User Service (RADIUS) mechanism may be used to allocate the IP address for the terminal device, or a Layer 2 Tunneling Protocol (L2TP) mechanism may be used to allocate the IP address for the terminal device.

Optionally, if the DGW allocates the IP address for the terminal device using the DHCP mechanism, the DGW may send an address allocation request message to a DHCP server (generally, an address of the DHCP server may be configured in the DGW). The address allocation request message is used to request the DHCP server to allocate an IP address for the terminal device. After receiving the address allocation request message, the DHCP server may allocate the IP address for the terminal device, and the DHCP server may send the allocated IP address for the DGW.

Optionally, if the DGW allocates the IP address for the terminal device using the RADIUS mechanism, the DGW may send an address allocation request message to an Authentication, Authorization and Accounting (AAA) server (generally, an address of the AAA server may be configured in the DGW). The address allocation request message is used to request the AAA server to allocate an IP address for the terminal device. After receiving the address allocation request message, the AAA server may allocate the IP address for the terminal device, and the AAA server may send the allocated IP address for the DGW.

Optionally, if the DGW allocates the IP address for the terminal device using the L2TP mechanism, and the terminal device accesses the network in a Point to Point Protocol (PPP) manner, the DGW may establish an L2TP link to an LNS based on an address of an L2TP network server (LNS) (generally, the address of the LNS may be configured in the DGW). After the LNS allocates an IP address for the terminal device, the DGW may obtain the IP address using the established L2TP link.

In addition, in addition to allocating the IP address for the terminal device, the DGW may further perform a conventional bearer establishment procedure, for example, install a bearer context delivered by the CGW.

If the CGW does not instruct the DGW to allocate the IP address, the CGW may allocate the IP address for the terminal device. In this case, the DGW does not allocate the IP address for the terminal device, and performs only the conventional bearer establishment procedure, for example, installs the bearer context delivered by the CGW.

5. The DGW sends an Sx interface request response message to the CGW. If the IP address is allocated by the DGW to the terminal device, and a value of Address Allocation Preference is IP address allocation via NAS signaling, the DGW adds, to the Sx interface request response message, the IP address allocated to the terminal device. If the IP address is allocated by the DGW to the terminal device, and a value of Address Allocation Preference is IPv4 address allocation via DHCPv4, the DGW adds, to the Sx interface request response message, a field used to carry the IP address (for example, may add a field used to indicate that the IP address is 0:0:0:0). If the CGW is responsible for allocating the IP address, in other words, the CGW does not instruct the DGW to allocate the IP address for the terminal device, to be more specific, the CGW does not send the address allocation indication to the DGW, the Sx interface request response message does not carry the IP address of the terminal device.

After receiving the IP address that is allocated to the terminal device and that is sent by the DGW, the CGW may send the IP address for the MME, and the MME sends the IP address for the terminal device using the access network device.

Example 2

Figure 6:
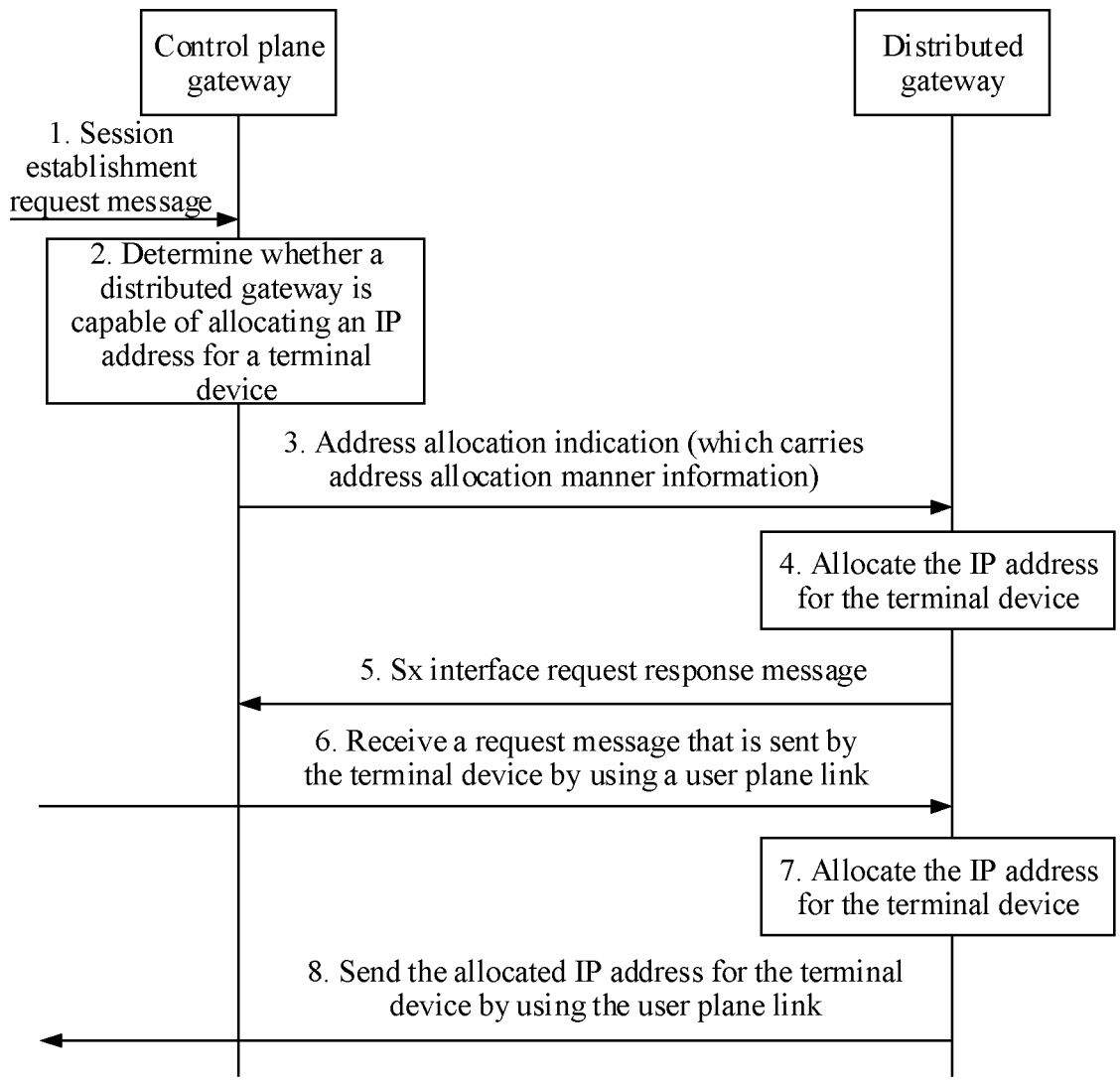
FIG. 6 is a second flowchart of allocating an IP address by a DGW according to an embodiment of the present disclosure.

Referring to FIG. 6, a case in which an IP address is allocated by a DGW to a terminal device, and a value of Address Allocation Preference is IPv4 address allocation via DHCPv4 is described in detail.

For step 1 to step 5 of the example 2, refer to the example 1, and the following describes steps different from the example 1.

6. After a default bearer is established, a DGW receives a request message that is sent by a terminal device using a user plane connection (the terminal device is also not shown in FIG. 6, and the request message is represented only by an arrow).

If the value of Address Allocation Preference is IPv4 address allocation via DHCPv4, the DGW temporarily does not allocate the IP address for the terminal device, and an Sx request message that is sent by the DGW to the CGW carries a field used to carry the IP address. In this case, the terminal device needs to send a request message again to request the IP address (for example, the request message may be a DHCP request message, or may be another possible request message). The request message may carry service information requested by the terminal device, for example, may carry an APN requested by the terminal device, and the terminal device may directly send the request message to the DGW using the user plane connection (a link shown by a dashed line arrow in FIG. 6), without using a device such as the CGW.

7. The DGW allocates an IP address for the terminal device based on service information carried in the request message.

Optionally, the DGW may allocate the IP address for the terminal device using an external mechanism.

The DGW allocates the IP address for the terminal device using the external mechanism. Similar to the description in step 4 in the example 1, different external mechanisms such as a DHCP mechanism, a RADIUS mechanism, or an L2TP mechanism may also be used to allocate the IP address for the terminal device. After receiving the request message, the DGW may determine, by resolving the service information carried in the request message, which manner is used to allocate the IP address for the terminal device.

Optionally, if it is determined that the IP address is allocated to the terminal device using the DHCP mechanism, the DGW may determine that a server that allocates the IP address for the terminal device is a DHCP server. An address of the DHCP server may be preconfigured in the DGW, and the DGW may send an address allocation request message to the DHCP server based on the address of the DHCP server, in order to request the DHCP server to allocate an IP address for the terminal device. After receiving the address alloca-tion request message, the DHCP server may allocate the IP address for the terminal device, and send the allocated IP address for the DGW.

Optionally, if it is determined that the IP address is allocated to the terminal device using the RADIUS mechanism, the DGW may determine that a server that allocates the IP address for the terminal device is an AAA server. An address of the AAA server may be preconfigured in the DGW, and the DGW may send an address allocation request message to the AAA server based on the address of the AAA server, in order to request the AAA server to allocate an IP address for the terminal device. After receiving the address allocation request message, the AAA server may allocate the IP address for the terminal device, and send the allocated IP address for the DGW.

Optionally, if it is determined that the IP address is allocated to the terminal device using the L2TP mechanism, the DGW may determine that a server that allocates the IP address for the terminal device is an LNS. An address of the LNS may be preconfigured in the DGW, and the DGW may establish a link to the LNS based on the address of the LNS, and send an address allocation request message to the LNS server using the established link, in order to request the LNS to allocate an IP address for the terminal device. After receiving the address allocation request message, the LNS may allocate the IP address for the terminal device, and send the allocated IP address for the DGW using the established link.

8. The DGW sends the allocated IP address for the terminal device using the user plane connection.

To be more specific, in this allocation manner, the DGW may directly send the allocated IP address for the terminal device using the user plane connection, without using a device such as the CGW.

In this embodiment of the present disclosure, an execution body for allocating the IP address in different network scenarios may be determined, to be more specific, negotiation may be performed between the CGW and the DGW to determine which of the two devices allocates the IP address for the terminal device, in order to avoid an IP address conflict. In addition, the CGW may also undertake partial work of allocating the IP address, in order to reduce a burden of the DGW. In addition, if the IP address is allocated using a local address pool, and in this case, if one CGW is connected to a plurality of DGWs, a relatively large quantity of IP addresses may need to be configured in the local address pool of the CGW, such that an allocation requirement of the CGW can be met. This imposes a relatively high requirement on the CGW. If the DGW undertakes partial work of IP address allocation, pressure of the CGW can be reduced, and operation and maintenance costs of the CGW can be reduced.

Devices provided in the embodiments of the present disclosure are described below with reference to the accompanying drawings.

Figure 7A:
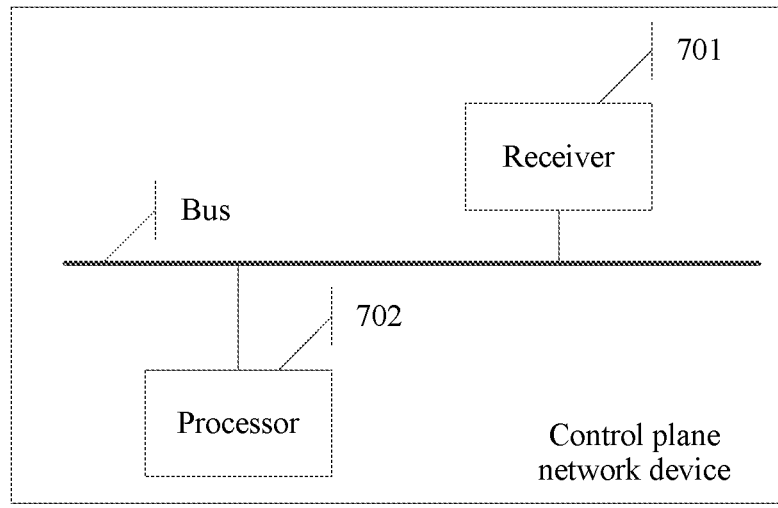
FIG. 7A and FIG. 7B are schematic structural diagrams of a control plane network device according to an embodiment of the present disclosure.

Referring to FIG. 7A, based on a same concept of the disclosure, a first control plane network device is provided, and the control plane network device may include a receiver 701 and a processor 702.

The processor 702 may include a central processing unit (CPU) or an application-specific integrated circuit (ASIC), or may include one or more integrated circuits configured to control program execution, or may include a hardware circuit developed using a field programmable gate array (FPGA), or may include a baseband chip.

The receiver 701 may be configured to perform network communication with an external device.

Figure 7B:
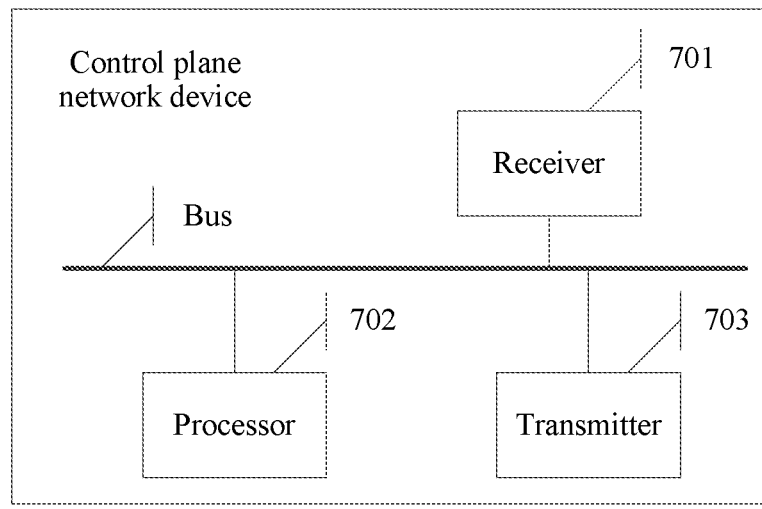

Optionally, referring to FIG. 7B, the control plane network device may further include a transmitter 703.

The transmitter 703 may be configured to perform network communication with an external device.

The transmitter 703 and the receiver 701 may be a same physical module, for example, may be a physical module that can implement receiving and transmitting functions. For example, the physical module may be referred to as a transceiver. Alternatively, the transmitter 703 and the receiver 701 may be separate physical modules.

The transmitter 703 and the receiver 701 may be connected to the processor 702 using a bus (this is used as an example in FIG. 7A and FIG. 7B), or may be separately connected to the processor 702 using a dedicated connection cable.

Code corresponding to the methods described above is embedded into a chip by designing and programming the processor 702, such that the chip can perform the methods shown in FIG. 3 to FIG. 6 during running. How to design and program the processor 702 is a technology well known to a person skilled in the art, and details are not described herein.

The control plane network device may be configured to perform the methods described in FIG. 3 to FIG. 6, for example, may be the foregoing control plane network device, which may be, for example, the foregoing CGW or the foregoing PGW-C. Therefore, for functions and the like implemented by the units in the control plane network device, refer to the description of the foregoing methods. Details are not described again.

Figure 8A:
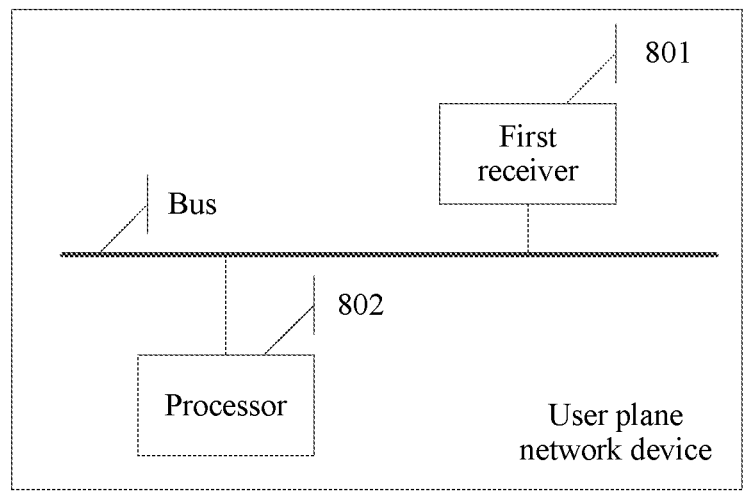
FIG. 8A to FIG. 8D are schematic structural diagrams of a user plane network device according to an embodiment of the present disclosure.

Referring to FIG. 8A, based on a same concept of the disclosure, an embodiment of the present disclosure provides a first user plane network device, and the user plane network device may include a first receiver 801 and a processor 802.

The processor 802 may include a CPU or an ASIC, may include one or more integrated circuits configured to control program execution, or may include a hardware circuit developed using an FPGA, or may include a baseband chip.

The first receiver 801 may be configured to perform network communication with an external device.

Figure 8B:
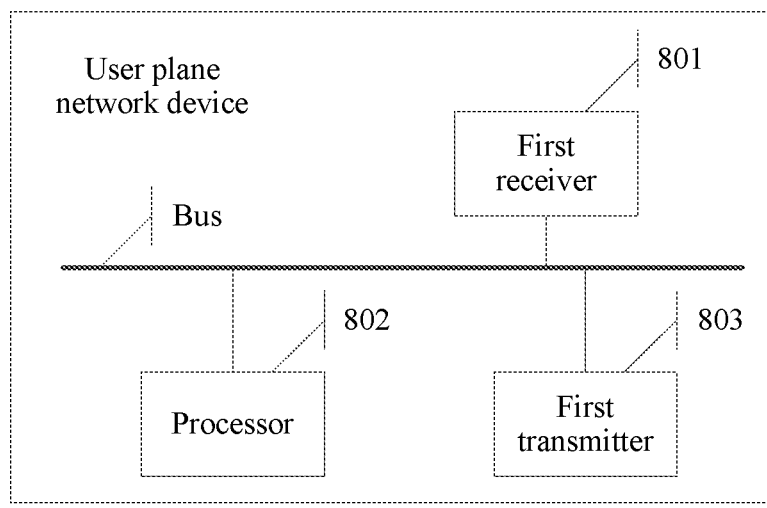

Optionally, referring to FIG. 8B, the user plane network device may further include a first transmitter 803, and the first transmitter 803 may be configured to perform network communication with an external device.

Figure 8C:
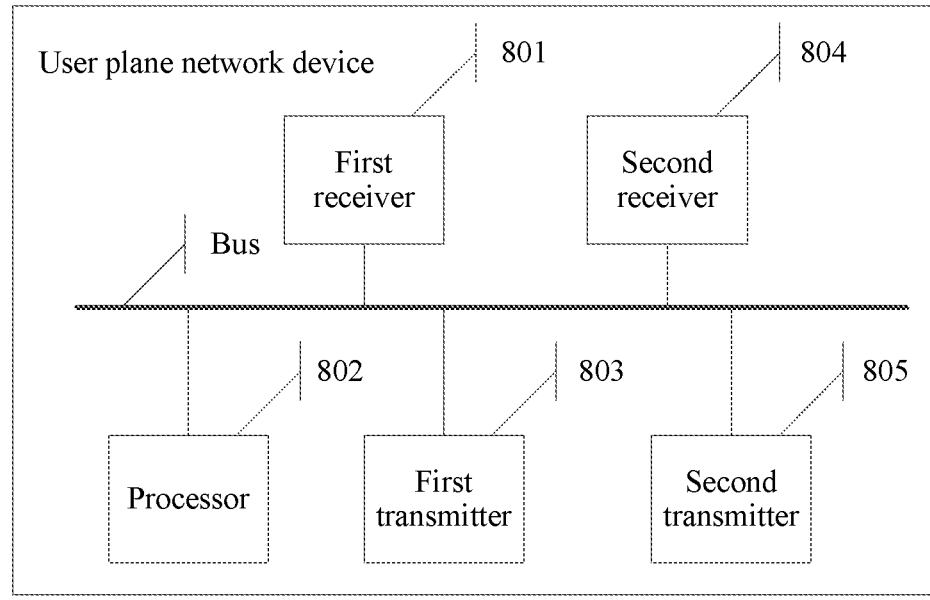

Optionally, referring to FIG. 8C, the user plane network device may further include a second receiver 804 and a second transmitter 805, and the second receiver 804 and the second transmitter 805 may be configured to perform network communication with an external device.

Figure 8D:
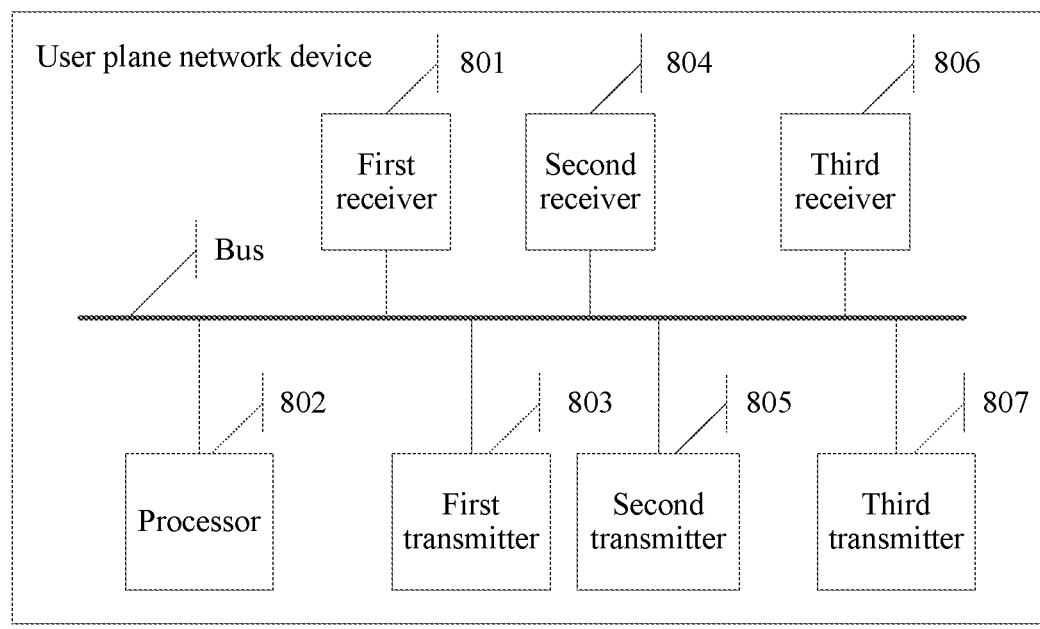

Optionally, referring to FIG. 8D, the user plane network device may further include a third receiver 806 and a third transmitter 807, and the third receiver 806 and the third transmitter 807 may be configured to perform network communication with an external device.

The transmitters and the receivers may be connected to the processor 802 using a bus (this is used as an example in FIG. 8A to FIG. 8D), or may be separately connected to the processor 802 using a dedicated connection cable.

Code corresponding to the methods described above is embedded into a chip by designing and programming the processor 802, such that the chip can perform the methods shown in FIG. 3 to FIG. 6 during running. How to design and program the processor 802 is a technology well known to a person skilled in the art, and details are not described herein.

The user plane network device may be configured to perform the methods described in FIG. 3 to FIG. 6, for example, may be the foregoing user plane network device, which may be, for example, the foregoing DGW or the foregoing PGW-U. Therefore, for functions and the like implemented by the units in the user plane network device, refer to the description of the foregoing methods. Details are not described again.

Figure 9:
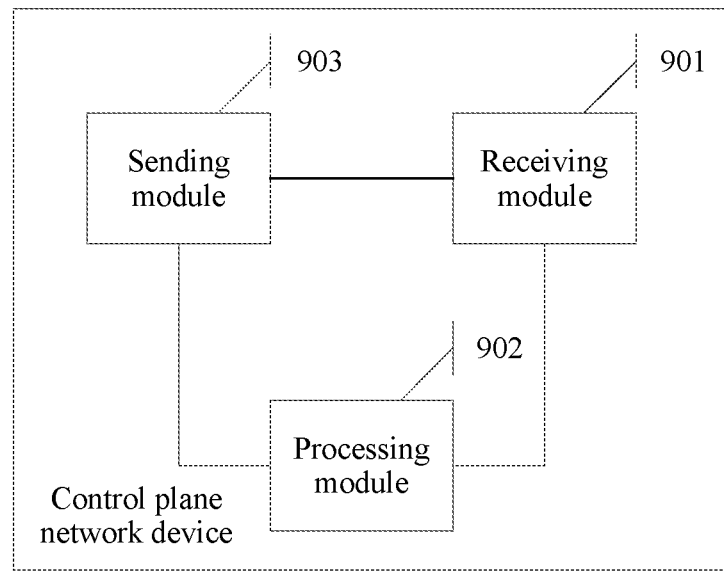
FIG. 9 is a structural block diagram of a control plane network device according to an embodiment of the present disclosure.

Referring to FIG. 9, based on a same concept of the disclosure, an embodiment of the present disclosure provides a second control plane network device, and the control plane network device may include a receiving module 901 and a processing module 902. Optionally, the control plane network device may further include a sending module 903.

In actual application, a physical device corresponding to the sending module 903 may be the transmitter 703 in FIG. 7B, a physical device corresponding to the processing module 902 may be the processor 702 in FIG. 7A and FIG. 7B, and a physical device corresponding to the receiving module 901 may be the receiver 701 in FIG. 7A and FIG. 7B.

The control plane network device may be configured to perform the methods described in FIG. 3 to FIG. 6, for example, may be the foregoing control plane network device, which may be, for example, the foregoing CGW or the foregoing PGW-C. Therefore, for functions and the like implemented by the units in the control plane network device, refer to the description of the foregoing methods. Details are not described again.

Figure 10:
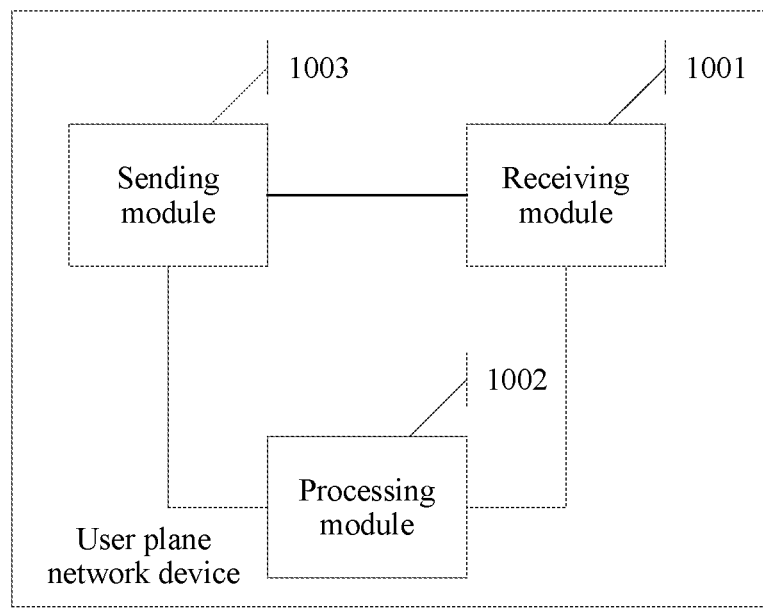
FIG. 10 is a structural block diagram of a user plane network device according to an embodiment of the present disclosure.

Referring to FIG. 10, based on a same concept of the disclosure, an embodiment of the present disclosure provides a second user plane network device, and the user plane network device may include a receiving module 1001 and a processing module 1002. Optionally, the user plane network device may further include a sending module 1003.

In actual application, the receiving module 1001 may communicate with a plurality of external devices. For example, a physical device corresponding to the receiving module 1001 may include any one or combination of the following: the first receiver 801 in FIG. 8A to FIG. 8D, the second receiver 804 in FIG. 8C and FIG. 8D, and the third receiver 806 in FIG. 8D. A physical device corresponding to the processing module 1002 may be the processor 802 in FIG. 8A to FIG. 8D. A physical device corresponding to the sending module 1003 may include any one or combination of the following: the first transmitter 803 in FIG. 8B to FIG. 8D, the second transmitter 805 in FIG. 8C and FIG. 8D, and the third transmitter 807 in FIG. 8D.

The user plane network device may be configured to perform the methods described in FIG. 3 to FIG. 6, for example, may be the foregoing user plane network device, which may be, for example, the foregoing DGW or the foregoing PGW-U. Therefore, for functions and the like implemented by the units in the user plane network device, refer to the description of the foregoing methods. Details are not described again.

It should be noted that, in FIG. 7A to FIG. 8D, a position of each functional module is merely an example, and does not represent an actual position of each functional module in a real device.

When receiving a session establishment request message, the control plane network device may determine whether a first user plane network device is capable of allocating an IP address for a terminal device. If the first user plane network device is capable of allocating the IP address for the terminal device, the control plane network device may instruct the first user plane network device to allocate the IP address for the terminal device. In this way, which device allocates the IP address may be determined, and a case in which two devices allocate an IP address for one terminal device at the same time is avoided, thereby avoiding an IP address conflict.

In the present disclosure, it should be understood that the disclosed device and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the embodiments of the present disclosure.

Functional units in the embodiments of the present disclosure may be integrated into one processing unit, or each of the units may be an independent physical module.

When the integrated unit is implemented in the form of a software functional unit and sold or used as an independent product, the integrated unit may be stored in a computer-readable storage medium. Based on such an understanding, all or some of the technical solutions of the present disclosure may be implemented in a form of a software product. The computer software product is stored in a storage medium and includes several instructions for instructing a computer device (which may be a personal computer, a server, or a network device) or a processor to perform all or some of the steps of the methods described in the embodiments of the present disclosure. The foregoing storage medium includes: any medium that can store program code, such as a universal serial bus (USB) flash drive, a removable hard disk, a read-only memory (ROM), a random-access memory (RAM), a magnetic disk, or an optical disc.

The foregoing embodiments are merely used to describe the technical solutions of the present disclosure. The foregoing embodiments are merely intended to help understand the methods in the embodiments of the present disclosure, and shall not be construed as a limitation on the embodiments of the present disclosure. Any variation or replacement readily figured out by a person skilled in the art shall fall within the protection scope of the embodiments of the present disclosure.

What is claimed is:

1. An Internet Protocol (IP) address allocation method, comprising:
   sending, by a user plane network device, service capability information of the user plane network device to a control plane network device;
   receiving, by the user plane network device, an address allocation indication from the control plane network device;
   allocating, by the user plane network device, an IP address for a terminal device based on the address allocation indication; and
   sending, by the user plane network device, the IP address to the control plane network device.

2. The IP address allocation method according to claim 1, wherein the address allocation indication comprises service information, and wherein allocating the IP address comprises allocating the IP address for the terminal device further based on the service information.

3. The IP address allocation method according to claim 2, wherein the service information indicates a service type requested by the terminal device.

4. The IP address allocation method according to claim 1, wherein the address allocation indication further comprises indication information, and wherein the indication information indicates to the user plane network device to allocate the IP address for the terminal device.

5. The IP address allocation method according to claim 1, wherein the address allocation indication comprises address allocation manner information, and wherein the address allocation manner information indicates a manner of allocating the IP address for the terminal device.

6. A user plane network device, comprising:
   a receiver configured to receive an address allocation indication from a control plane network device, wherein the address allocation indication comprises address allocation manner information, and wherein the address allocation manner information indicates a manner of allocating an Internet Protocol (IP) address for a terminal device;
   a processor configured to allocate the IP address for the terminal device based on the address allocation indication; and
   a transmitter configured to:
     send service capability information of the user plane network device to the control plane network device, wherein the user plane network device is capable of allocating the IP address for the terminal device; and
     send the IP address to the control plane network device.

7. The user plane network device according to claim 6, wherein the address allocation indication comprises service information, and wherein the processor is configured to allocate the IP address for the terminal device further based on the service information.

8. The user plane network device according to claim 7, wherein the service information indicates a service type requested by the terminal device.

9. The user plane network device according to claim 6, wherein the address allocation indication further comprises indication information, and wherein the indication information indicates to the user plane network device to allocate the IP address for the terminal device.

10. The user plane network device according to claim 6, wherein the address allocation indication further comprises address allocation manner information, and wherein the address allocation manner information indicates a manner of allocating the IP address for the terminal device.

11. An Internet Protocol (IP) address allocation method, comprising:
    receiving, by a control plane network device, a request message, wherein the request message requests establishing a session for a terminal device, wherein the request message comprises service information, and wherein the service information indicates a service type requested by the terminal device;
    determining, by the control plane network device based on the service information and service capability information of a user plane network device, whether the user plane network device is capable of allocating an IP address for the terminal device;

sending, by the control plane network device, an address allocation indication to the user plane network device in response to determining that the user plane network device is capable of allocating the IP address for the terminal device;

receiving, by the user plane network device, the address allocation indication from the control plane network device;

allocating, by the user plane network device, the IP address for the terminal device based on the address allocation indication; and sending, by the user plane network device, the IP address to the control plane network device.

12. The IP address allocation method according to claim 11, further comprising receiving, by the control plane network device, the service capability information of the user plane network device from the user plane network device.

13. The IP address allocation method according to claim 11, wherein the address allocation indication comprises address allocation manner information, and wherein the address allocation manner information indicates a manner in which the user plane network device is to allocate the IP address for the terminal device.

14. The IP address allocation method according to claim 13, further comprising obtaining, by the control plane network device, the address allocation manner information using the service information in the request message.

15. The IP address allocation method according to claim 11, wherein the address allocation indication further comprises the service information, and wherein allocating the IP address comprises allocating the IP address for the terminal device based on the service information.

16. A communications system for Internet Protocol (IP) address allocation, comprising:
a user plane network device; and
a control plane network device configured to:
receive a request message, wherein the request message requests to establish a session for a terminal device, wherein the request message comprises service information, and wherein the service information indicates a service type requested by the terminal device;
determine, based on the service information and service capability information of the user plane network device, whether the user plane network device is capable of allocating an IP address for the terminal device; and
send an address allocation indication to the user plane network device in response to determining that the user plane network device is capable of allocating the IP address for the terminal device,
wherein the user plane network device is configured to:
receive the address allocation indication from the control plane network device;
allocate the IP address for the terminal device based on the address allocation indication; and
send the IP address to the control plane network device.

17. The communications system according to claim 16, wherein the control plane network device is further configured to receive the service capability information from the user plane network device.

18. The communications system according to claim 16, wherein the address allocation indication comprises address allocation manner information, and wherein the address allocation manner information indicates a manner in which the user plane network device is to allocate the IP address for the terminal device.

19. The communications system according to claim 18, wherein the control plane network device is configured to obtain the address allocation manner information using the service information in the request message.

20. The communications system according to claim 16, wherein the address allocation indication further comprises the service information, and wherein the user plane network device is configured to allocate the IP address for the terminal device based on the service information.

* * * * *